No. 620,475. Patented Feb. 28, 1899.
W. R. MINER.
AUTOMATIC MACHINE FOR TAPPING NUTS.
(Application filed May 17, 1898.)
(No Model.) 4 Sheets—Sheet 1.
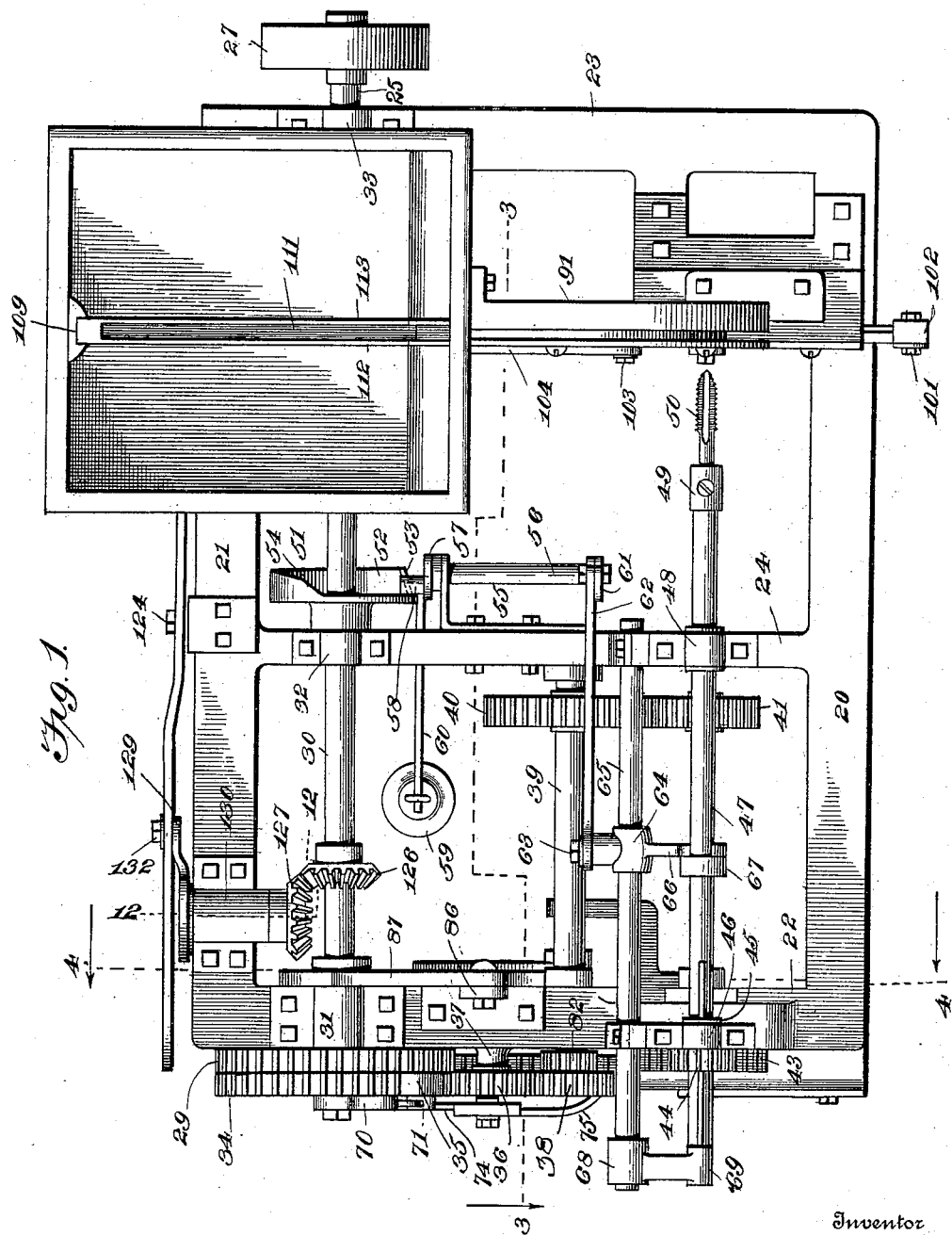
Witnesses
Inventor
Wm. R. Miner,
by
Attorneys

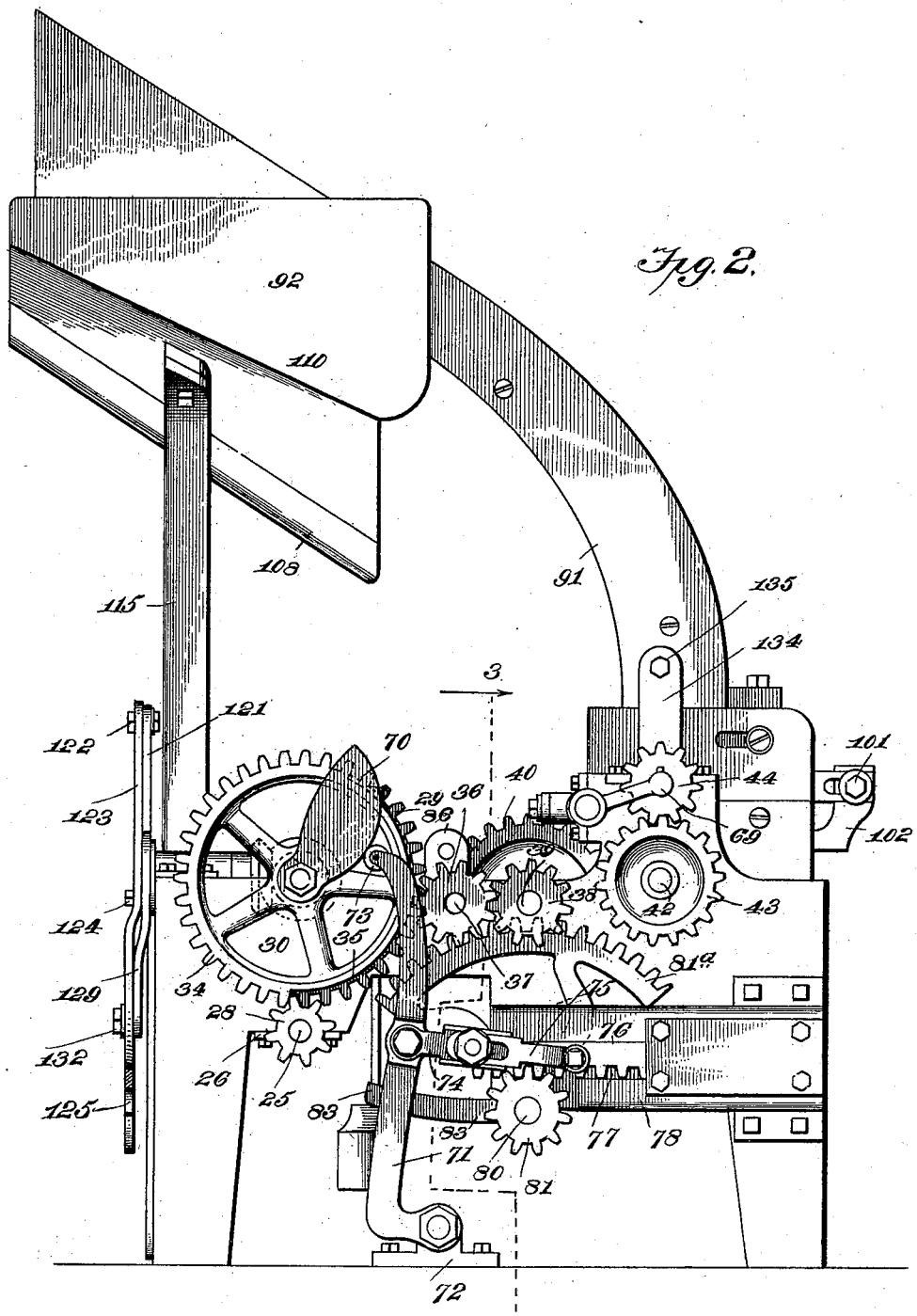

No. 620,475. Patented Feb. 28, 1899.
W. R. MINER.
AUTOMATIC MACHINE FOR TAPPING NUTS.
(Application filed May 17, 1898.)
(No Model.) 4 Sheets—Sheet 3.
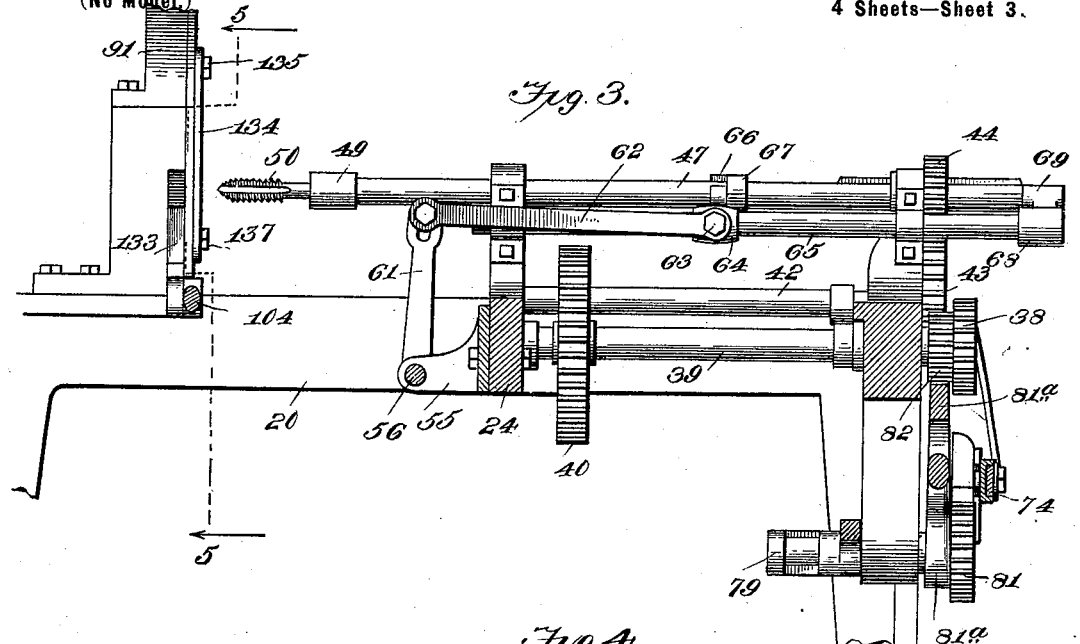
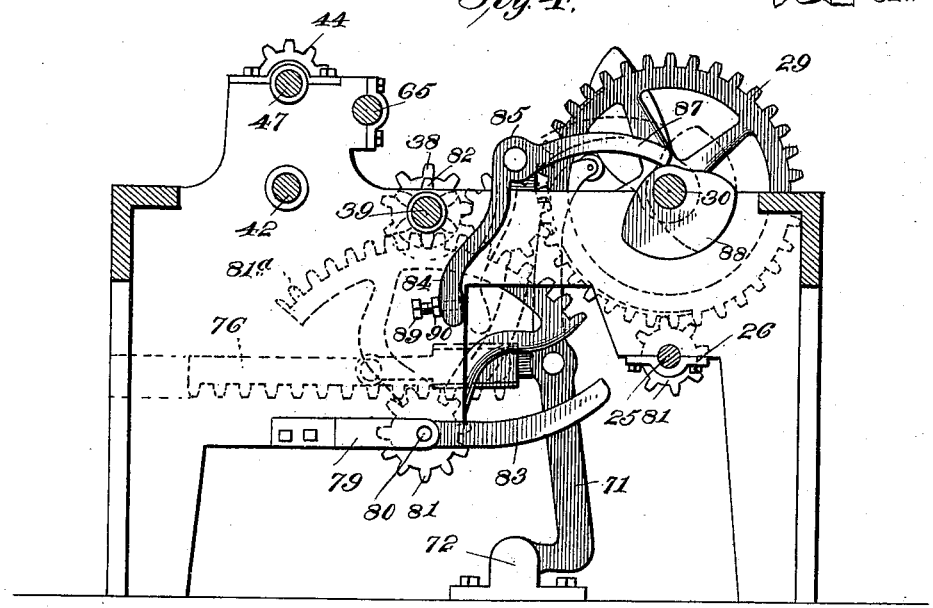
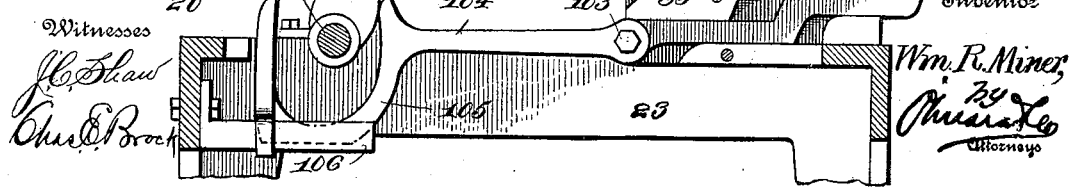
Witnesses
Inventor
Wm. R. Miner
Attorneys
THE NORRIS PETERS CO., PHOTO-LITHO., WASHINGTON, D. C.

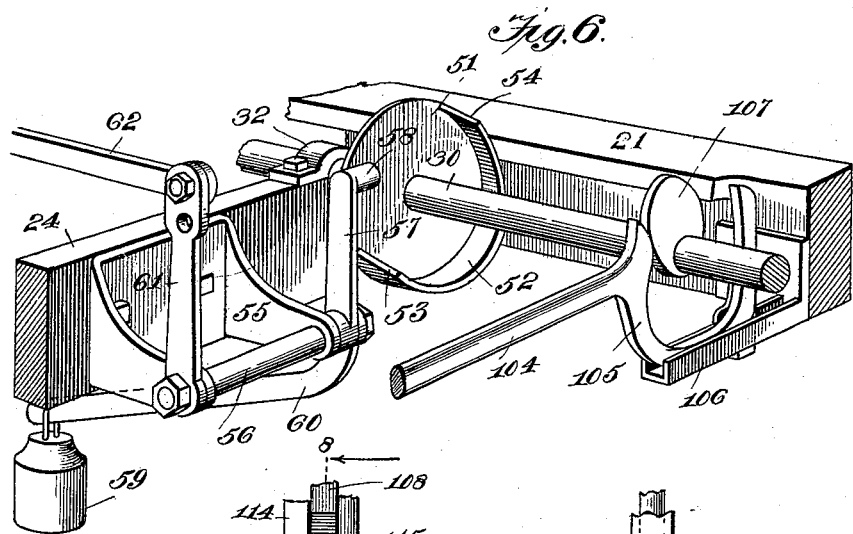

UNITED STATES PATENT OFFICE.

WILLIAM R. MINER, OF COLUMBUS, OHIO.

AUTOMATIC MACHINE FOR TAPPING NUTS.

SPECIFICATION forming part of Letters Patent No. 620,475, dated February 28, 1899.

Application filed May 17, 1898. Serial No. 680,951. (No model.)

*To all whom it may concern:*

Be it known that I, WILLIAM R. MINER, a citizen of the United States, residing at Columbus, in the county of Franklin and State of Ohio, have invented a new and useful Automatic Machine for Tapping Nuts, of which the following is a specification.

My invention relates to machines for tapping or screw-threading nut-blanks, and has for its object to generally improve the construction and operation of such machines.

With this object in view my invention consists in a machine of this class comprising certain improved constructions, arrangements, and combinations of parts which go to make up improved means for feeding the blanks to the tap, for feeding the tap forward to the nut and rotating it therein, for holding the nut while being threaded, for withdrawing the tap by reversing its rotation and quickly drawing it away from the tapped nut, and for discharging the tapped nut and placing another in position to be tapped, all as will be fully described hereinafter and afterward specifically pointed out in the appended claims.

In order to enable others skilled in the art to which my invention most nearly appertains to make and use the same, I will now proceed to describe its construction and operation, reference being had to the accompanying drawings, forming part of this specification, in which—

Figure 1 is a top plan view of a nut-tapping machine constructed in accordance with my invention. Fig. 2 is an end elevation thereof. Fig. 3 is a vertical sectional view on the broken lines 3 3 of Figs. 1 and 2, looking in the direction of the arrows. Fig. 4 is a vertical sectional view on the line 4 4 of Fig. 1, looking in the direction of the arrows. Fig. 5 is a sectional view on the broken line 5 5 of Fig. 3. Fig. 6 is a detail perspective view of a portion of the machine on an enlarged scale. Fig. 7 is a detail view in elevation of the actuating mechanism of the feeding-plunger. Fig. 8 is a sectional view on the line 8 8 of Fig. 7. Fig. 9 is a detail perspective view of the spring for holding the nut in position to be tapped. Fig. 10 is a vertical section on a vertical plane extending through the hopper. Fig. 11 is a detail perspective view of the feeding-plunger. Fig. 12 is a detail sectional view on the line 12 12 of Fig. 1, the parts being in different positions.

Referring to the drawings by numerals, 20 indicates the front, 21 the rear, and 22 and 23 the sides, of the main frame of the machine, which may be constructed of any suitable material, the front 20 and rear 21 being connected by a cross-beam 24.

25 indicates the main driving-shaft, which is journaled in bearings secured to the ends of the frame, one of said bearings being illustrated at 26 in Figs. 2 and 4. This shaft 25 is driven by any suitable power communicated by belt to a pulley 27, Fig. 1, and carries a pinion 28, which engages with and rotates a gear-wheel 29 on a cam-shaft 30, journaled in bearings 31, 32, and 33, secured on top of the ends 22 and 23 and the cross-beam 24 of the main frame. Another gear-wheel 34 is mounted on the shaft 30 alongside of the gear-wheel 29, substantially one-half of its teeth being cut away, leaving it blank or smooth to that extent, as at 35. This mutilated-gear wheel 34 meshes with a pinion 36 on a stub-shaft 37, which acts as an idler to transmit the motion of the shaft 30 to a pinion 38 on a shaft 39, journaled in the end 22 and cross-beam 24 of the frame. On the shaft 39 is a gear-wheel 40, which meshes with a gear-wheel 41 on a shaft 42, journaled in the end 22 and cross-beam 24 of the frame. A gear-wheel 43 on the shaft 42 meshes with a pinion 44, forming part of a sleeve 45, journaled in a bearing 46, mounted on the end 22 of the frame. A shaft 47 is splined in the sleeve 45 to slide therein, but turn therewith, said shaft being journaled in a bearing 48, mounted on the cross-beam 24 and provided with a clutch device 49 at its inner end to hold a screw-cutting tap 50.

51 indicates a disk mounted on the shaft 30 and provided with a circumferential flange 52 at right angles to the body of the disk, said flange extending a little more than half around the disk and terminating in cams or inclined edges 53 and 54. In suitable bearings carried by a bracket 55, secured to the cross-beam 24, is journaled a rock-shaft 56, on which is secured an elbow-lever, whose vertical arm 57 carries a friction-roller 58, held normally in contact with the cam by a weight 59 on the horizontal arm 60 of the elbow-lever. The rock-shaft also carries an arm 61 at its opposite end, which is pivotally connected to one end of a connecting-rod 62, which is pivotally connected at its opposite end to a pin 63, projecting laterally from a sleeve-block 64, secured to a rod or bar 65, mounted to slide in bearings in the end 22 and cross-beam 24 of the frame. The sleeve-block 64 has an arm 66, projecting laterally, which is formed at its outer end to embrace the shaft 47 inside of and in contact with a stop-sleeve 67, secured on said shaft. At its outer end the rod 65 is provided with a sleeve-block 68, having a lateral arm 69, which bears against the outer end of the shaft 47.

On the outer end of the shaft 30 is secured a cam 70, which during each revolution of the shaft serves to press outward the upper end of a vertical lever 71, pivoted at its lower end to a bearing 72, secured to the base of the machine, the lever being provided with a friction-roller 73 at the point of contact with the cam. About centrally of the lever is pivoted a bar 74, to which is adjustably connected a bar 75, the two together forming a connecting-rod adjustable in length and pivotally secured at its opposite end to a rack-bar 76, seated in a horizontal groove 77, formed in a plate 78, attached to the end 22 of the frame.

Journaled in the end 22 of the frame and in a bracket 79, secured to the inner side of said end, is a short shaft 80, upon which are secured outside of the end 22 a gear-wheel 81, meshing with the teeth of the rack-bar 76, and a segmental rack 81$^a$, meshing with a pinion 82 on the shaft 39. Inside of the end 22 the shaft 80 carries an arm 83, which engages one arm 84 of an elbow-lever 85, pivoted to a bracket 86 on top of the end 22 of the frame, the other arm 87 being actuated by a cam 88, secured on the cam-shaft 30. At the point of contact with the arm 83 the arm 84 of the elbow-lever is provided with an adjusting set-screw 89, provided with a lock-nut 90 to retain it in any position to which it is adjusted.

91 indicates a chute into which nut-blanks are fed from a hopper 92, the blanks dropping edgewise into a space 93, provided below the end of the chute.

94 indicates a finger fitted to slide horizontally in a groove which extends laterally from the seat, its purpose being to press the nut into position to be tapped, said position being between two rectangular steel blocks 95 and 96, removably secured by screws 97 and 98, so that all four of the sides of each block may be turned to face the opposite block, such faces becoming worn by the nuts in using the machine. A recess 99 is provided to receive the end of the tap after it passes through the nut.

The finger 94 is provided with a longitudinal slot 100 in its outer end to receive a screw or bolt 101, by means of which it is adjustably connected to a slide-bar 102, connected by a bolt 103 to the end of a bar 104, provided with a yoke 105, fitted to slide in a guideway 106, secured to the rear 21 of the frame. This bar is actuated by a cam 107 on the cam-shaft 30, revolving between the bars of the yoke, which are disconnected at their upper ends, rendering it possible to remove the cam-shaft from the machine without removing or disturbing the yoke.

The chute 91 is connected to the hopper 92, communicating therewith through an opening 92$^a$ in one side of the hopper near its upper end. The nut-blanks in the hopper are brought up to and discharged through this opening into the chute by means of a vertical plunger 108, which is arranged to reciprocate in a vertical slot through the bottom of the hopper, its rear edge also working in a groove formed at 109 in one side of the hopper. The bottom of the hopper and the top of the plunger are inclined downward toward that side of the hopper to which the chute is attached, and the top of the plunger is provided with a groove 111, one wall 112 of which is higher than the other wall 113. In its vertical reciprocation the plunger is guided between standards 114 and 115, mounted on the rear 21 of the frame, upon the upper ends of which standards the hopper is supported. Depending from the bottom of the plunger 108 is a vertical rod 116, upon which a sleeve 117 is adjustably clamped by a set-screw 118, which is passed through and guided in a vertical slot 119 in a plate 120, depending from the outer side of the rear 21 of the frame. The set-screw 118 before passing through the slot 119 is passed through the lower end of a link or connecting-rod 121 and pivotally connects it with the vertical rod 116. The upper end of the link 121 is pivotally connected by a screw or bolt 122 to one end of a lever 123, pivoted at 124 to the rear 21 of the frame and having its opposite end longitudinally slotted at 125.

126 indicates a bevel gear-wheel secured to the cam-shaft 30 and meshing with a bevel gear-wheel 127 on a short shaft 128, secured at its outer end to a crank-arm 129 and journaled in a bearing 130 on the top of the rear 21 of the frame. The crank-arm 129 is provided with a wrist-pin 131, which engages in the slot 125 of the lever 123 and is prevented from disengagement by a nut 132, threaded upon its reduced outer end.

133 indicates a passage-way or opening through which the nuts are discharged after being tapped, the nuts being held from falling out of their seat between the steel blocks 95 and 96 prior to the entrance of the tap into the nut by a spring-plate 134, secured to the lower part of the chute 91 by a bolt or screw 135, passed through an opening 136 in the upper end of the plate and held from lateral displacement at the bottom by means of a screw or bolt 137, passing through a similar opening 138 near its lower end. This plate is provided with a reinforcement on its inner side at 139 in the shape of a nut, an opening 140 being made through it coinciding with the opening of the nut when in position to be tapped to permit of the passage of the tap to the nut.

The construction of my invention will be readily understood from the foregoing, and its operation may be described as follows: The hopper being supplied with nut-blanks promiscuously placed therein, the first upward movement of the plunger 108 will engage some of them in the groove 111, the blanks lying edgewise therein for the reason that the groove is too narrow to receive them flatwise, and when the lower corner of the top of the plunger reaches a height to bring the end of the groove to the level of the upper end of the chute 91 the blanks in the groove will slide into the chute and drop through it, one blank above the other, the lower blank dropping into the space 93 between the inner end of the finger 94 and the space between the blocks 95 and 96. Any blanks which might be lifted flatwise by the plunger will slide off the top thereof laterally owing to the uneven height of the walls of the groove and drop back into the hopper. The continued vertical reciprocation of the plunger will keep the chute full of blanks, such reciprocation being effected by means of the rotation of the cam-shaft 30 through the medium of the bevel-gears 126 and 127, the crank-arm 129, the pivoted slotted lever 123, connecting-link 121, and depending rod 116, the plunger being given one complete reciprocation during the tapping of each nut, so that if there is only one blank taken up in the plunger-groove each time the full supply of nuts in the chute will be kept up. Each time the cam-shaft rotates the cam 107 gives a complete reciprocation to the bar 104, the sliding bar 102, and the finger 94, causing the latter during its forward movement to press the lower blank of the stack in the chute 91 and space 93 into the seat between the blocks 95 and 96 and to press the nut already tapped out of the seat and into the discharge-passage 133, from which it will drop into any suitable receptacle placed to receive it. During this forward movement of these parts the stack of blanks in the chute rests at its base on the finger 94, and when the finger is withdrawn the lowermost nut of the stack drops into place to be fed forward by the next forward movement of the finger.

The movements of the parts of the machine are timed so that as soon as the finger 94 has pressed a nut-blank into position to be tapped the tap 50 is pressed into the blank and rotated to the right to cut the thread. While this is taking place the finger is withdrawn and is held at rest at the outer limit of motion until the rotation of the tap is reversed, and it is withdrawn from the finished nut to permit it to be discharged during the next forward movement of the finger. The forward and backward movements of the tap are produced by the action of cams 53 and 54 of the disk 51 to move the rock-shaft in one direction and the weight 59 to move it in the opposite direction, the action of the rock-shaft being communicated to the tap and its shaft 47 by means of the arm 61, link 62, sleeve 64, arm 66, rod 65, and arm 69, the forward movement accomplished by the cam 54 being slow and positive and the backward movement or return being quick and governed by the cam 53.

The reversal of rotation of the tap is accomplished as follows: The forward or right-hand rotation is caused by the direct action of the teeth of the mutilated gear 34 through the medium of the pinions 36 and 38, shaft 39, gear-wheel 40, pinion 41, shaft 42, gear 43, and pinion 44 upon the tap-shaft 47 and continues until the end of the teeth is reached and the gear 36 is opposite the smooth untoothed portion of the periphery of the mutilated gear. During this forward rotation the pinion 82 has been in engagement with the segmental rack 81ª and has carried it forward, its oscillation causing the pinion 80 to rotate in engagement with the teeth of the rack-bar 76 and press it forward, carrying the pivoted cam-lever 71 with it until at the end of the movement the friction-roller 73 on the end of the lever 71 is in position to engage the root of the cam 70 on the cam-shaft 30. At this moment the last tooth of the mutilated gear passes out of engagement with the pinion 36, leaving the whole train of gearing free to rotate in either direction. The cam 70 now presses the lever 71 and through it the rack-bar 76 outward, rotating the shaft 80 and with it the segmental rack-bar 81ª in contact with the pinion 82, turning that pinion, its shaft, and the whole train of gearing, so as to rotate the tap backward or to the left and withdraw it from the threaded nut. At the end of the backward movement the teeth of the mutilated gear 34 again engage the teeth of the pinion 36, and in order that the teeth shall properly mesh with each other the backward movement is started by causing the lower arm 84 of the bell-crank lever 85, actuated by the contact of the upper arm 87 with the cam 88, to press upon the arm 83, secured to the same shaft 80 as the segmental rack 81ª, whereby the reverse movement of the bell-crank lever is started and all danger of breakage due to the accidental engagement of the ends of the teeth of the mutilated gear 34 with those of the pinion 36 is avoided.

From the foregoing it will be obvious that I have provided a complete machine all the parts of which are positively driven without friction-gearing and which will take the nuts dumped promiscuously in the hopper and deliver them tapped without the necessity of any hand manipulation.

The arrangement of the gearing is such as to cause the least possible wear on the bearings, thereby increasing the accuracy of the work, ease of operation, and life of the machine.

While the various mechanical movements, especially the positive gearing with reverse and quick return, are illustrated herein as applied to my automatic nut-tapping machine, it will of course be understood that any of them may be applied to other machinery in which similar movements are required, and while I have illustrated and specifically described the construction of the various parts of my automatic nut-tapping machine I do not wish to be understood as restricting myself to the exact details of construction shown, but hold that any slight changes or variations such as might suggest themselves to the ordinary mechanic would properly fall within the limit and scope of my invention.

Having thus fully described my invention, what I claim as new, and desire to secure by Letters Patent of the United States, is—

1. The combination in an automatic nut-tapping machine, of a hopper, having its bottom inclined inwardly and laterally and provided with a central vertical slot, a chute communicating with the hopper above and in line with the lower end of the bottom, and a vertical plunger, slidably arranged in the slot in the hopper, having its upper edge formed into a groove inclining downward toward the chute side of the hopper, the walls of said groove being of different heights, substantially as described.

2. The combination in an automatic nut-tapping machine, of a hopper, having its bottom inclined inwardly and laterally and provided with a central vertical slot, a chute communicating with the hopper above and in line with the lower end of the bottom, a vertical plunger, slidably arranged in the slot in the hopper, having its upper edge formed into a groove inclining downward toward the chute side of the hopper, the walls of said groove being of different heights, and means for vertically reciprocating the plunger, substantially as described.

3. The combination in an automatic nut-tapping machine, of a hopper, having its bottom inclined inwardly and laterally and provided with a central vertical slot, a chute communicating with the hopper above and in line with the lower end of the bottom, a vertical plunger, slidably arranged in the slot in the hopper, having its upper edge formed into a groove inclining downward toward the chute side of the hopper, the walls of said groove being of different heights, a rod depending vertically from the plunger, a collar on said rod, a vertical, slotted guide-plate secured to the frame parallel with the rod, a set-screw securing the collar to the depending rod, a lever pivoted to the frame of the machine and longitudinally slotted at one end, a link connecting the collar set-screw with said lever, a crank-arm driven from the cam-shaft of the machine, and a wrist-pin on the crank-arm, engaging in the slot in the pivoted lever, substantially as described.

4. In an automatic nut-tapping machine, the combination of the cam-shaft of the machine, a bevel-gear thereon, a nut-hopper, a vertical plunger therein, a rod depending therefrom, a lever pivoted to the frame of the machine parallel with the cam-shaft, longitudinally slotted in one end, a link pivotally connected to the depending rod and to one end of the lever, a short shaft journaled in bearings on top of the frame of the machine, a crank-arm on said shaft, a wrist-pin on the crank-arm, engaging in the slot of the lever, and a bevel-gear on the short shaft, engaging the bevel-gear on the cam-shaft, substantially as described.

5. In an automatic nut-tapping machine, the combination of a nut-hopper, a chute leading downward therefrom to a space extending laterally in opposite directions and comprising in one direction a seat to hold the nuts while being tapped and a discharge-passage, a finger seated in the opposite lateral passage, a parallel slide-bar connected at its outer end to the finger, a bar pivotally connected to the inner end of the slide-bar, a yoke formed on said bar, open at its top, a slideway in which the yoke is supported, the cam-shaft of the machine passing through the yoke, and a cam on the cam-shaft adapted to reciprocate the yoke and its attachments, all substantially as described.

6. In an automatic nut-tapping machine, the combination of the cam-shaft, a disk thereon provided with a partial annular flange formed with two cam inclines at its ends, a bracket secured to the frame, a rock-shaft journaled therein, an elbow-lever on one end of the rock-shaft, a roller on the upright arm thereof contacting with the cam inclines, a weight on the horizontal arm thereof, an arm on the other end of the rock-shaft, a slidable bar mounted in the frame, a link connecting it with the last-named arm of the rock-shaft, a slidable and rotatable shaft carrying a tap, and connections between the slidable bar and tap-shaft, substantially as described.

7. In an automatic nut-tapping machine, the combination of the cam-shaft, a mutilated gear thereon, the tap-shaft, a gear-wheel thereon, and a train of gearing engaging the teeth of the mutilated gear at one end and the tap-shaft gear at the other end, whereby the tap-shaft is driven in a forward direction, all substantially as described.

8. In an automatic nut-tapping machine, the combination of the tap-shaft, a gear-wheel thereon for rotating it, a parallel shaft geared to the tap-shaft by means of gear-wheels and an intermediate shaft, a pinion on the parallel shaft, a segmental rack engaging said pinion, a gear on the pivotal shaft of the segmental rack, a horizontal rack engaging said gear, a lever pivoted to the frame, a link connecting it with the horizontal rack, the cam-shaft, and a cam for oscillating the pivoted lever, substantially as described.

9. In an automatic nut-tapping machine, the combination of the tap-shaft, a gear-wheel thereon for rotating it, a parallel shaft geared to the tap-shaft by means of gear-wheels and an intermediate shaft, a pinion on the parallel shaft, a segmental rack engaging said pinion, a gear on the pivotal shaft of the segmental rack, a horizontal rack engaging said gear, a lever pivoted to the frame, a link connecting it with the horizontal rack, the cam-shaft, a cam for oscillating the pivoted lever, an arm on the inner end of the shaft of the segmental rack, an elbow-lever pivoted to the frame, one arm of which engages the arm on the segmental rack-shaft, and a second cam on the cam-shaft engaging the other arm of the elbow-lever, substantially as described.

WILLIAM R. MINER.

Witnesses:
   JOHN F. LONGMAN,
   ROBERT P. WARD.